United States Patent [19]

Mienko et al.

[11] Patent Number: 4,788,821
[45] Date of Patent: Dec. 6, 1988

[54] HYDRAULIC SHIFT FOR MOTOR VEHICLE TRANSMISSION

[75] Inventors: David K. Mienko, Clawson; John G. Vander Poorte, St. Clair Shores; Keith V. Leigh-Monstevens, Troy, all of Mich.

[73] Assignee: Automotive Products, plc, Warwickshire, England

[21] Appl. No.: 99,645

[22] Filed: Sep. 24, 1987

Related U.S. Application Data

[63] Continuation of Ser. No. 755,417, Jul. 16, 1985, abandoned, which is a continuation-in-part of Ser. No. 555,666, Nov. 28, 1983.

[51] Int. Cl.$^4$ ............................................. B60T 11/26
[52] U.S. Cl. ........................................ 60/585; 60/534; 60/570; 60/572; 92/118
[58] Field of Search ............... 60/571, 572, 573, 583, 60/584, 585, 592, 534, 570; 91/437; 92/118

[56] References Cited

U.S. PATENT DOCUMENTS

| | | | |
|---|---|---|---|
| 2,648,290 | 8/1953 | Ashton | 60/572 |
| 3,915,516 | 10/1975 | Hildebrand | 92/118 |
| 4,030,560 | 6/1977 | Parguet | 60/571 |
| 4,407,125 | 10/1983 | Parsons | 60/592 |
| 4,423,664 | 1/1984 | Buchl | 91/1 |
| 4,445,334 | 5/1984 | Derrick | 60/585 |
| 4,532,768 | 8/1985 | Focqueur | 60/592 |
| 4,607,670 | 8/1986 | Compton | 60/584 |

Primary Examiner—Abraham Hershkovitz
Attorney, Agent, or Firm—Krass & Young

[57] ABSTRACT

A hydraulic apparatus for remotely controlling the operative mode selector of a motor vehicle automatic transmission. The apparatus comprises a master cylinder having an input member operatively connected to the transmission operative mode selection or shift lever placed at the disposal of the motor vehicle operator, and a slave cylinder mounted on or proximate the transmission casing and having an output member connected to the transmission operative mode selector, the master cylinder and the slave cylinder being placed in fluid communication through flexible conduits such that each displacement of the master cylinder piston as a result of displacement of the master cylinder input member causes a corresponding displacement of the slave cylinder piston coupled to the slave cylinder output member. The master cylinder is provided with a built-in reservoir of hydraulic fluid connected to the working chambers, one on each side of the master cylinder piston, by valved passageways permitting flow of fluid from the reservoir to the low pressure chamber and closing the high pressure chamber from the reservoir so as to compensate for slow changes in hydraulic fluid volume due to expansion and contraction. The master cylinder and the slave cylinder are pivotably and adjustably mounted to a stationary support bracket by a ball and socket arrangement having an eccentric mounting aperture.

21 Claims, 6 Drawing Sheets

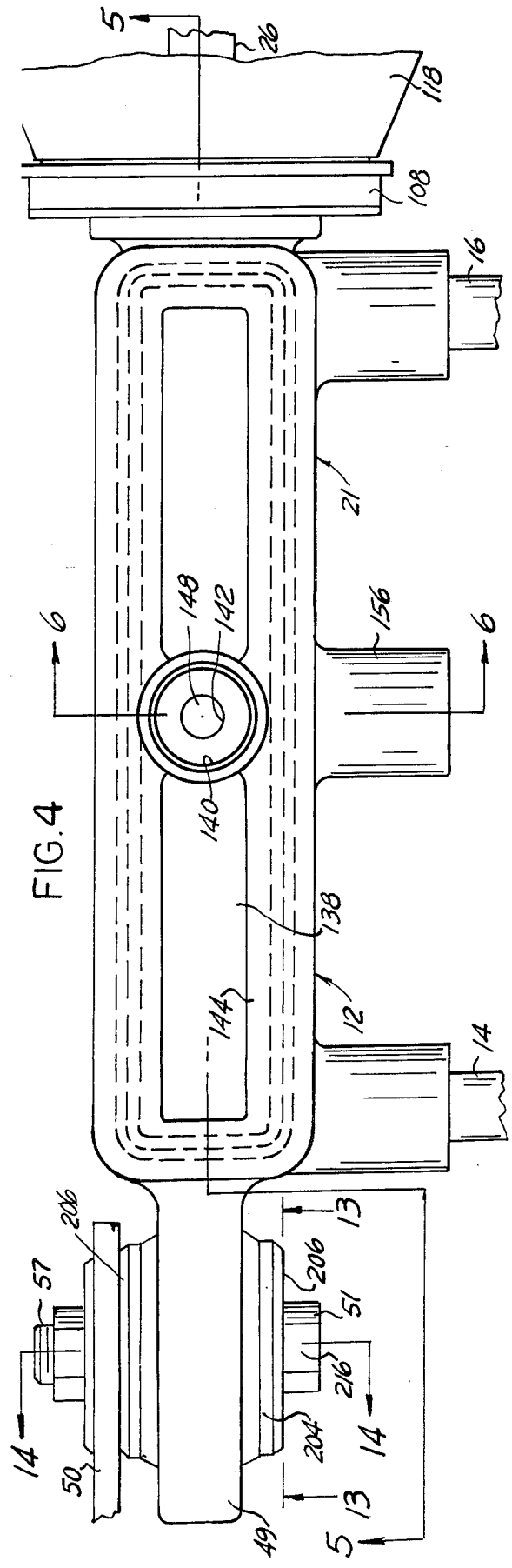
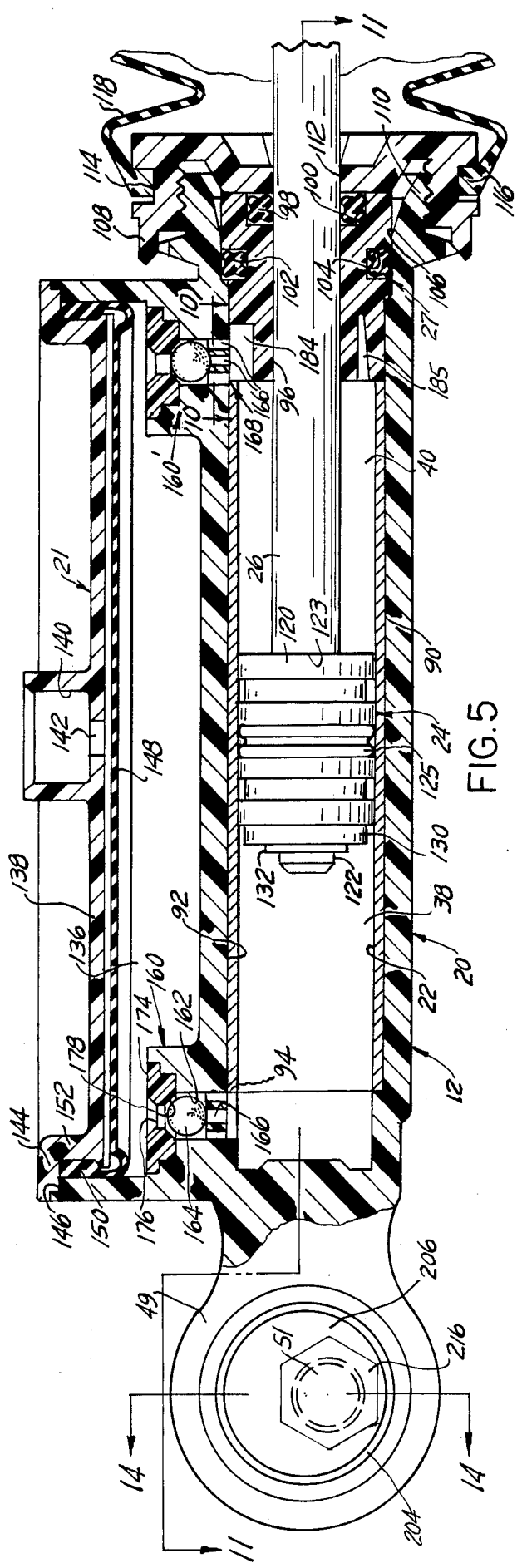

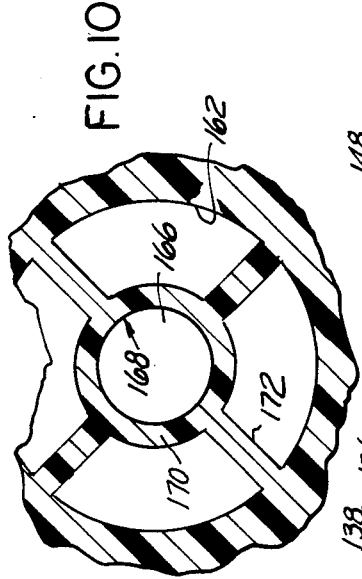
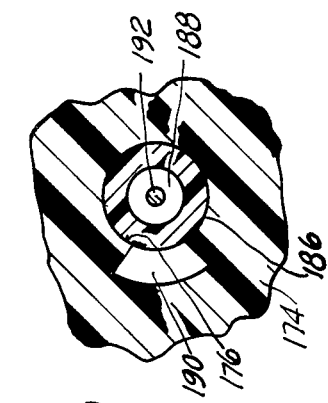
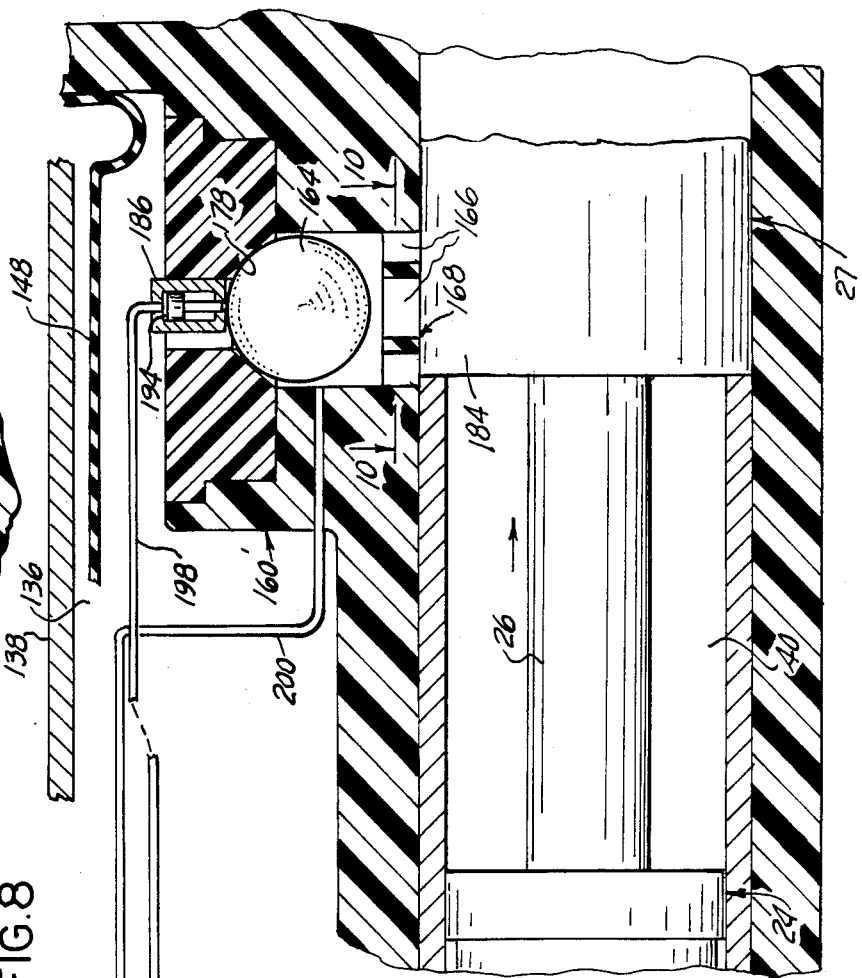
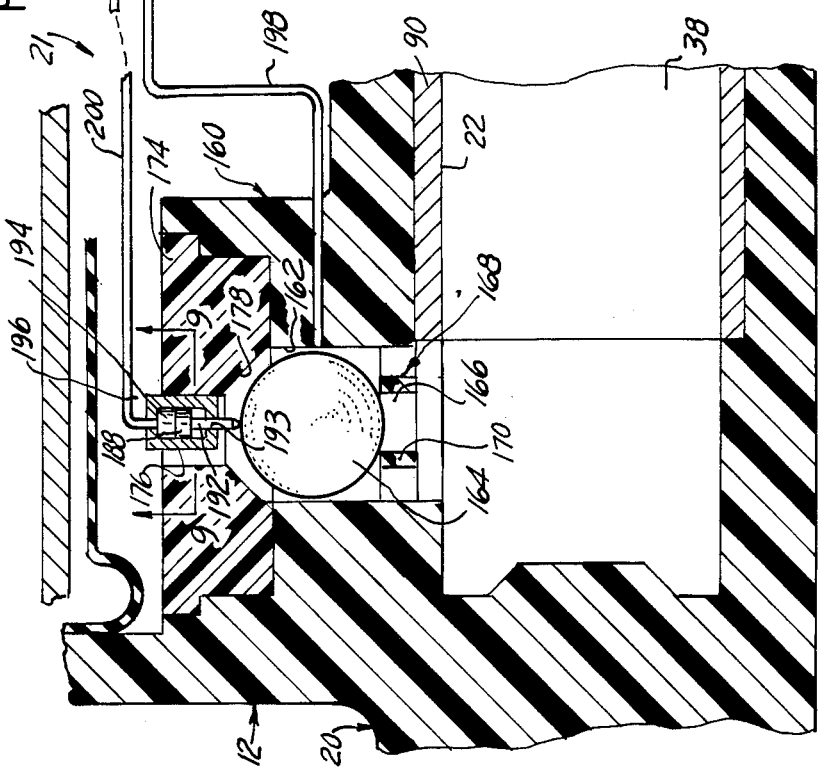

HYDRAULIC SHIFT FOR MOTOR VEHICLE TRANSMISSION

CROSS-REFERENCE TO RELATED APPLICATION

This is a continuation of co-pending application Ser. No. 755,417 filed on July 16, 1985, now abandoned, which is continuation-in-part of co-pending Ser. No. 555,666, filed Nov. 28, 1983.

BACKGROUND OF THE INVENTION

The present invention relates to a hydraulic apparatus for remotely shifting a motor vehicle transmission in general, and more particularly an automatic transmission.

Motor vehicle automatic transmissions are provided with a manual control for selecting the mode of operation of the transmission, for example for shifting from park and/or neutral to reverse or to forward drive, or to prevent automatic shifting from a high gear ratio to a lower gear ratio or to straight-through drive, or to overdrive. The manual control or selector takes the form of a steering column mounted pivotable lever, or of a floor mounted shift lever or quadrant.

The shift control lever or selector conventionally operates, through cables or rods and links, a mode selection arm pivotally mounted on the transmission casing, the mode selection arm being mounted on the end of a control input shaft projecting from the transmission casing and adapted to operate diverse control members within the transmission casing, such as hydraulic valves or solenoids, for functionally establishing an operative mode of the transmission under the control of the shift control or selector lever. The selected operative mode corresponds to an appropriate position of the shift control or selector lever, and an indication of the selected operative mode is provided to the motor vehicle operator in the form of a visual display, for example in the form of a sector with appropriate markings, each corresponding to a selected operative mode. The visual display or indicator is conventionally placed on one or both edges of a housing mounted on the floor and through which projects the floor mounted shift control or selector lever or, in installations provided with a steering column mounted selector lever, the selected mode of operation of the transmission is indicated through the displacement of a cursor in the front of an indicator panel or sector.

Mechanical linkages between the shift control or selector lever and the control input arm of the transmission are rather complex, more particularly in installations wherein it is desired to control the automatic transmission associated with a front wheel drive motor vehicle in which the transmission and differential are enclosed in a common casing, the whole mechanism forming a so-called transaxle which is generally mounted on the motor vehicle frame in front of the engine or parallel to a transversely mounted engine, in view of the many bends required around diverse components installed in a very crowded engine compartment, or in rear-engine vehicles such as buses and coaches.

SUMMARY OF THE INVENTION

The principal object of the present invention is to provide a flexible hydraulic linkage for motor vehicle automatic transmissions between the motor vehicle transmission shift lever, or mode selector lever, operable by the motor vehicle driver, and the transmission mode input control at the transmission casing or housing. The present invention provides hydraulic coupling between the shift control or mode selection lever and the transmission, the operating member controlling the transmission mode input at the transmission casing end taking the form of a slave cylinder connected by flexible preformed conduits, which can be wrapped around any obstructions in the engine compartment, to a master cylinder whose input member is operated by the shift control or mode selection lever, the hydraulic apparatus being a constant volume hydraulic apparatus providing precise positioning of the slave cylinder output member which is the analog of the linear position of the master cylinder input member as displaced by the driver operated shift control or mode selection lever. The present invention further provides a remote light indicator or annunciator of the selected operative mode of the transmission, which can be mounted at any appropriate position on a motor vehicle instrument panel.

The hydraulic apparatus of the invention is prefilled and pretested, after full assembly and prior to shipment to a motor vehicle manufacturer for installation in a motor vehicle on the assembly line. Preferably, the input member of the master cylinder is held by a restraining strap, during shipment and installation of the apparatus on a motor vehicle, at a position facilitating installation in the motor vehicle and connecting to the shift or mode selection lever, and the output member of the slave cylinder is also maintained in an appropriate position by a restraining strap. The restraining straps are so constructed that they do not interfere with normal operation of the apparatus after installation on a motor vehicle.

The present invention provides an improvement over the hydraulic system disclosed in prior application Ser. No. 555,666 in that a hydraulic fluid reservoir is provided for the master cylinder having valved passageways in communication with the cylinder chamber on each side of the master cylinder piston which, in addition to providing an additional supply of hydraulic fluid, permits to compensate for uneven expansion of the hydraulic fluid in the conduits connecting the master cylinder to the slave cylinder, such that the positioning of the slave cylinder output member remains constantly an analog of the positioning of the master cylinder input member. In addition, the present invention provides adjustable mounting means for the master and slave cylinders compensating manufacturing and assembly tolerances of the motor vehicle co-operating components.

The many objects and advantages of the present invention will become apparent to those skilled in the art when the following description of examples of the best mode contemplated at the present for practicing the invention is read in conjunction with the accompanying drawing wherein like reference numerals refer to like or equivalent parts, and in which:

BRIEF DESCRIPTION OF THE DRAWING

FIG. 4 is a top plan view of the master cylinder;

FIG. 5 is a longitudinal section thereof along line 5—5 of FIG. 4;

FIG. 8 is a partial view similar to FIG. 5, at an enlarged scale, and showing a modification thereof;

FIG. 9 is a partial section along line 9—9 of FIG. 8;

FIG. 10 is a partial section along line 10—10 of FIG. 5 or line 10—10 of FIG. 8;

DETAILED DESCRIPTION OF THE PREFERRED EMBODIMENTS

Figure 1:
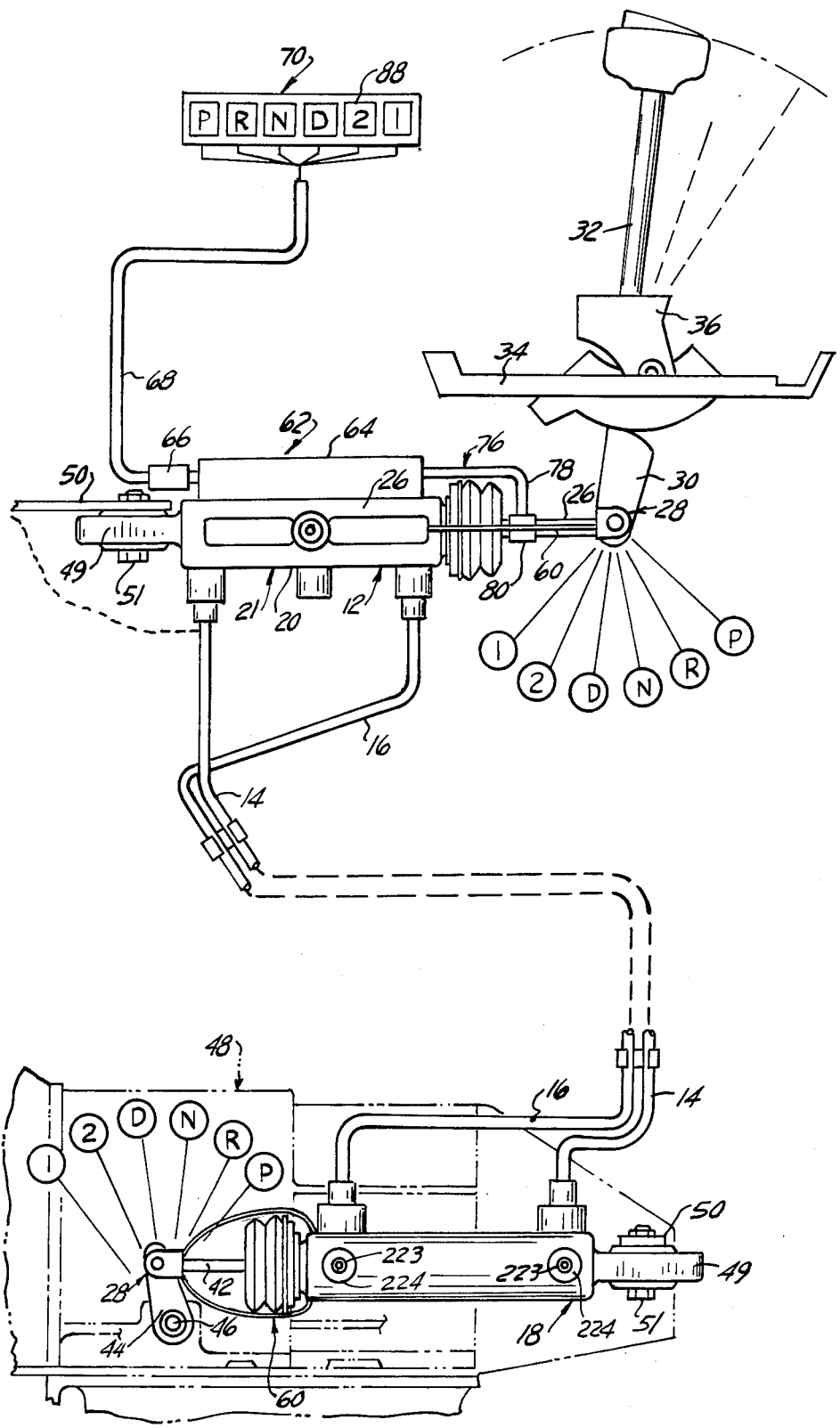
FIG. 1 is a schematic illustration of an automatic transmission hydraulic remote mode selector according to the present invention illustrated in a structure for operation by a floor shift lever or mode selection lever.

Referring now to the drawing and more particularly to FIG. 1 thereof, there is illustrated a hydraulic apparatus according to the present invention comprising a master cylinder 12 hydraulically connected via a pair of flexible conduits 14 and 16 to a slave cylinder 18. The master cylinder 12 takes the form of a cylindrical housing 20, provided with an integral reservoir 21 of hydraulic fluid. The master cylinder housing 20 has a longitudinal bore 22, FIGS. 5 and 11, in which is disposed a reciprocable piston 24. The piston 24 is mounted on the end of a push-rod 26 passing through a seal-provided bore in an end cap 27 closing one end of the bore 22.

As further illustrated at FIG. 1, the other end of the push-rod 26 is pivotally connected through a clevis and pin arrangement 28, for example, to the end of an arm 30 mounted on the end of a shift lever, or mode selection lever, 32 pivotally mounted through the floor 34 of the driver's compartment of a motor vehicle, in the usual manner. The mode selection lever 32 is pivotable about a fulcrum arrangement 36. Angular positioning of the mode selection lever 32 about its fulcrum pivot arrangement or structure 36 causes substantially linear displacement of the push rod 26 and consequently of the piston 24, FIGS. 5 and 11, within the master cylinder bore 22 such that hydraulic fluid contained in a chamber 38 on one side of the piston 24 is displaced through the conduit 14, and hydraulic fluid in a chamber 40, formed on the other side of the piston 24, is displaced through the conduit 16 connected to the chamber 40.

Figure 12:
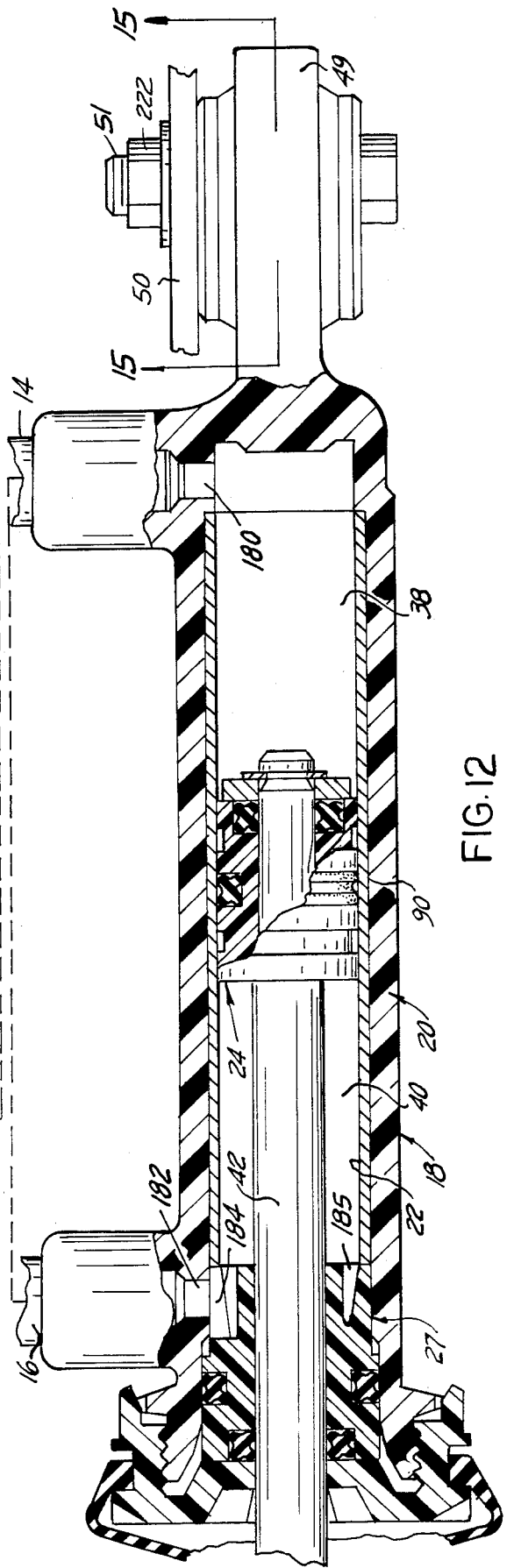
FIG. 12 is a longitudinal section similar to FIG. 11, but showing the slave cylinder.

The slave cylinder 18 is identical, in bore and stroke, to the master cylinder 12 as a result of also being in the form of a tubular housing 20 having a bore 22, FIG. 12, in which is disposed, reciprocably, a piston 24 dividing the bore 22 into two chambers 38 and 40 disposed on one side and on the other side of the piston 24. The piston 24 is mounted on the end of an output rod 42. The chamber 38 of the master cylinder 12 is connected through the flexible conduit 14 to the chamber 38 of the slave cylinder 18, and the chamber 40 of the master cylinder 12 is connected to the chamber 40 of the slave cylinder 18, via the flexible conduit 16, with the result that any linear motion of the master cylinder input rod 26 causes a correspondingly analagous linear displacement of the slave cylinder output rod 42.

As shown at FIG. 1, the end of the slave cylinder output rod 42 is pivotally connected by a clevis and pin arrangement 28, for example, to the end of a transmission mode selection arm 44 clamped or otherwise mounted on the transmission function or mode input member taking the form of an angularly positionable shaft 46 projecting from the housing of the transmission 48. The slave cylinder 18 is attached at its end provided with an integral lug 49 to a bracket 50 at an appropriate location on the housing or casing of the transmission 48, while the master cylinder is also mounted by means of an identical lug 49 in an appropriate position on a bracket 50 on the motor vehicle frame, not shown, each by means of a bolt 51 such that each cylinder housing 20 is pivotally and adjustably attached to a support member, as will be described hereinafter in detail, to permit the housing to self-orient to compensate for the rigid connection between its piston and, respectively, the push-rod 26 or 42.

Figure 2:
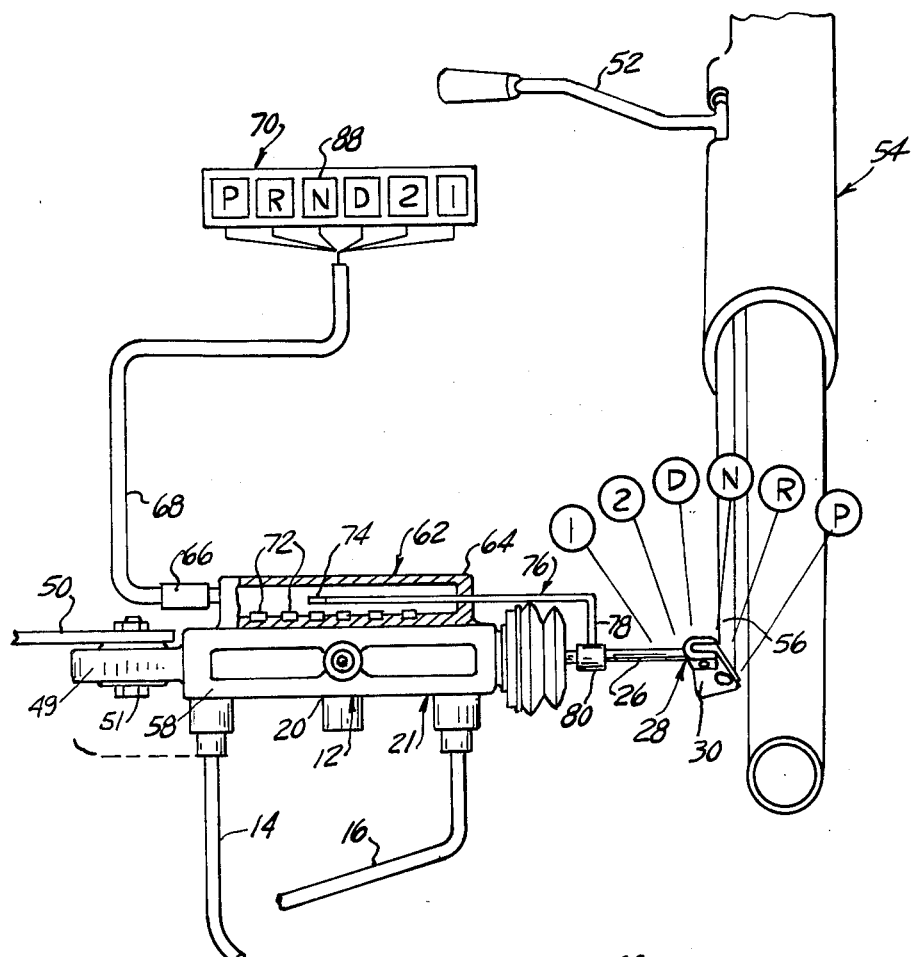
FIG. 2 is a partial view similar to FIG. 1 but showing a modification for operation by a steering column mounted shift lever or mode selection lever, with portions broken away to illustrate internal structures not shown at FIG. 1.

It is readily apparent that the structure of the invention is the same whether the master cylinder input rod 26 is operated by a floor mounted shift or mode selection lever 32, FIG. 1, or whether it is operated by a shift or mode selection lever 52, FIG. 2, mounted on the steering column 54 of a motor vehicle, the shift or mode selection lever 52 rotatably operating a rod 56 provided on its end with an arm 30 coupled through a clevis and pin arrangement 28, for example, to the end of the master cylinder input rod or pushrod 26.

It will be appreciated that, because the chambers 38 have a slightly larger volume than the chambers 40, in view of the presence of the push-rods 26 and 42, respectively, in the chamber 40 of the master cylinder 12 and in the chamber 40 of the slave cylinder 18, respectively, the arrangement of FIG. 1 provides equal displacement of the slave cylinder push-rod or output member 42 for each unit of displacement of the master cylinder input member or push-rod 26. If unequal displacement is desirable, the conduits 14 and 16 may be crossed such that the chamber 38 of the master cylinder 12 is connected to the chamber 40 of the slave cylinder 18, and the chamber 40 of the master cylinder 12 is connected to the chamber 38 of the slave cylinder 18.

The hydraulic apparatus is prefilled with hydraulic fluid after assembly of the components and connection of the master cylinder 12 to the slave cylinder 18 by way of the flexible conduits 14 and 16. Preferably, the method for prefilling the hydraulic apparatus is the method disclosed in detail in copending application Ser. No. 400,276, filed July 21, 1982, assigned to the same assignee as the present application.

Preferably, the output member or push-rod 42 of the slave cylinder 18 is held, during prefilling of the apparatus with hydraulic fluid, by a restraining strap 60, while the input member or pushrod 26 of the master cylinder 12 is held by a similar restraining strap 60. The restraining straps 60 are similar in structure to those disclosed in prior application Ser. No. 344,495, now U.S. Pat. No. 4,454,632, assigned to the same assignee as the present application. The restraining straps 60 maintain the respective push-rods 26 and 42 against extension in a position facilitating installation of both the master cylinder 12 and slave cylinder 18 by positioning the end of the push-rods 26 and 42 respectively in appropriate positions. Upon first actuation of the master cylinder input member or push-rod 26 toward an extended position, the associated restraining strap 60, provided with a break-away portion, breaks, as is the case for the restraining strap 60 associated with the output member or push-rod 42 of the slave cylinder 18.

The connection of the master cylinder 12 to the slave cylinder 18 via the flexible conduits 14 and 16 may be effected through the intermediary of leak-proof connectors, as disclosed in detail in co-pending application Ser. No. 555,667, such that the master cylinder 12 and the slave cylinder 18 may be disconnected from each other after filling with hydraulic fluid and reconnected after installation on a motor vehicle.

Figure 3:
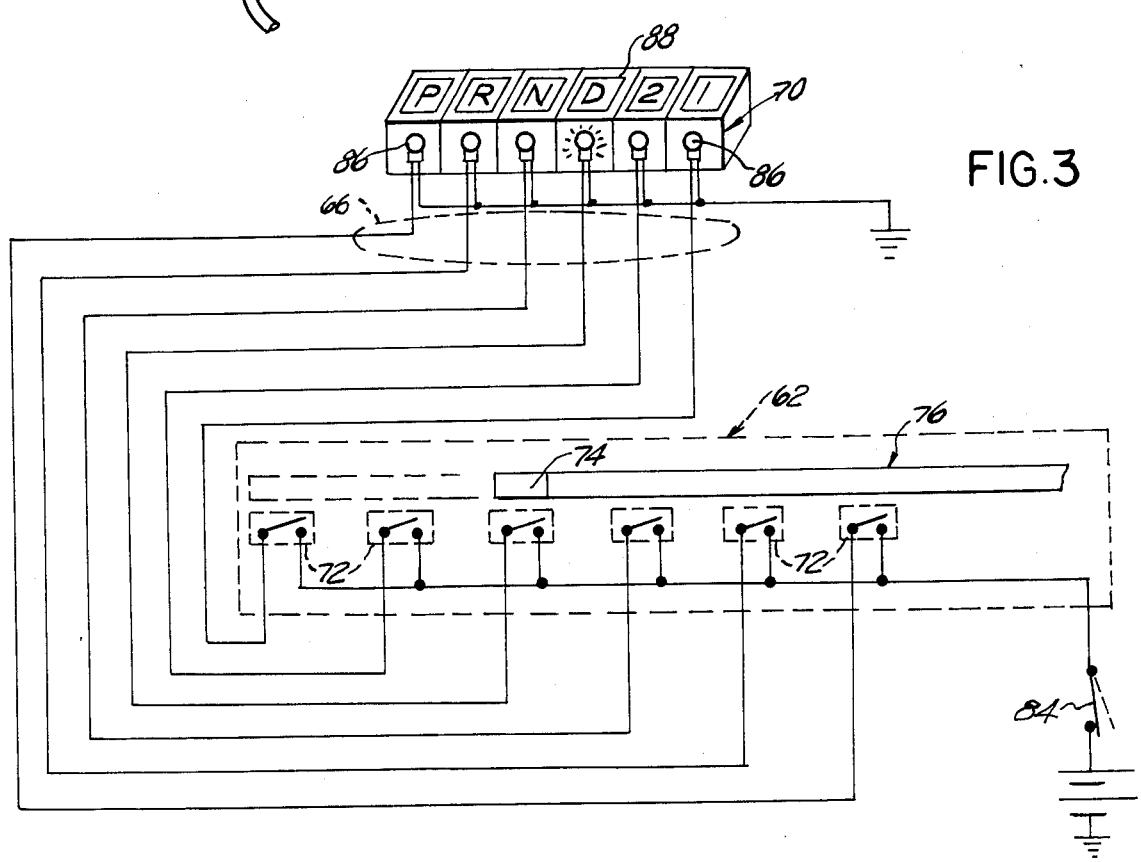
FIG. 3 is an electrical circuit schematic of the indicator portion of FIGS. 1 and 2.

An operative mode indicator transmitter 62 disposed in a housing 64 attached to or formed integral with the housing 20 of the master cylinder 12 is electrically connected by way of an electrical connector 66 and a harness 68 to an operative mode light indicator or annunciator 70, installed in an appropriate location, for example on the instrument panel, in full view of the motor vehicle driver. As best shown at FIG. 2 and in the circuit diagram of FIG. 3, the transmission operative mode sender or transmitter 62 takes the form of a plurality of magnetic reed switches 72 mounted at regular intervals within the housing 64, and separately actuatable by proximity with a permanent magnet 74 mounted on the end of a rod 76 coupled to the master cylinder input rod 26 and being linearly displaceable in unison therewith, as a result of being provided with a bent-over portion 78 having a clamp 80 on its end for attachment at an appropriate location to the master cylinder input member or push-rod 26. The reed switches 72 have one of their terminals connected through a common line to a terminal, such as the positive terminal, of the electrical DC power source of the motor vehicle through a switch 84, which may be the ignition switch or a relay switch closed when the ignition switch is turned on. Each of the other terminals of the reed switches 72 is connected by an individual wire in the harness 68 to a terminal of one of a plurality of light bulbs 86 mounted in the instrument panel indicator or annunciator 70 behind a window 88. The annunciator window 88 is separated in sections, each indicating a particular mode of operation of the transmission, such as P for "park", R for "reverse", N for "neutral", D for "drive" (normal), 2 for second gear and 1 for first or lower gear. Each light bulb 86 is mounted behind the window 88 such that the light emitted by the light bulb illuminates only the appropriate section of the annunciator window 88 corresponding to that light bulb. The other terminal of each light bulb 86 is returned to ground when a circuit through an appropriate reed switch 72 is closed, while all the other reed switches 72 are open, when the permanent magnet 74 mounted on the end of the rod 76 is proximately located to that reed switch 72. It can thus be seen that when the input member or push-rod 26 of the master cylinder 12 is displaced by the floor mounted shift or mode selection lever 32 or the steering column mounted shift or mode selection lever 52, the operative mode transmitter 62 provides at the instrument panel annunciator 70 the illumination of a corresponding one of the light bulbs 86, whose circuit is closed through the appropriate reed switch 72, with the result that the annunciator window 88 displays a lit portion corresponding to the appropriate transmission operative mode selected by the driver.

Figure 11:
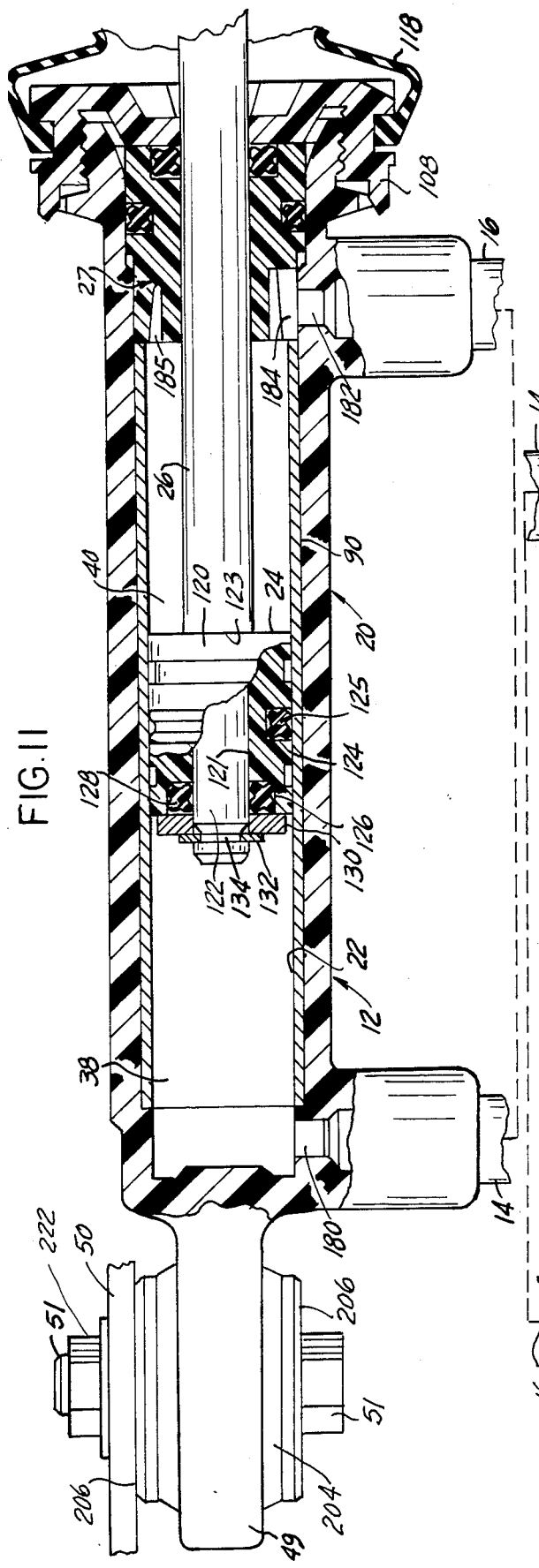
FIG. 11 is a longitudinal section along line 11—11 of FIG. 5, with portion broken away to show the internal structure of the piston.

As shown in detail at FIGS. 4, 5 and 11, the master cylinder 12 has a tubular housing 20, preferably made of a plastic molding, in which is disposed a metallic sleeve 90 defining the cylinder longitudinal bore 22 in which is reciprocably disposed the piston 24. The sleeve 90 takes the form of a tubular member fitted in a bore 92 in the housing 20 and having an end abutting against an annular shoulder 94 proximate the end of the housing 20 provided with the integral mounting lug 49. The other end of the tubular member forming the sleeve 90 is held in position by the end cap 27 having a longitudinal bore 96 in which reciprocates the input rod 26, a compressed elastomeric annular quad seal 98 disposed in a groove 100 in the bore 96 preventing hydraulic fluid in the cylinder chamber 40 from leaking to the ambient along the rod 26, and a similar quad seal 102 disposed in a peripheral groove 104 preventing escape of hydraulic fluid from the chamber 40 to the ambient along the periphery of the end cap 27. The end cap 27 fits in an enlarged end portion 106 of the housing bore 92. A retainer collet 108 holds the end cap 27, with its end firmly engaged with the end of the sleeve 90, by being threadably fitted, as shown at 110, over a threaded peripheral end portion of the housing 20. The end cap retainer collet 108 has a central bore 112 through which projects the rod 26. The end cap retainer collet 108 has a peripheral groove 114 in which is elastically held the end flange 116 of an elastomeric bellows boot 118 protecting from the ambient the surface of the rod 26 projecting from the cylinder housing 20.

The piston 24, as best shown at FIG. 5 and broken away at FIG. 11, comprises a cylindrical plastic body 120 having a longitudinal bore 121 through which is passed the reduced diameter end portion 122 of the rod 26, the end face of the piston body 120 abutting a shoulder 123 formed between the reduced diameter end portion 122 of the rod 26 and the larger diameter portion of the rod 26. The piston body has a peripheral groove 124, in which is installed a compressed quad seal 125 engaged with the internal surface of the cylinder sleeve 90, and an end annular recess 126 in which is disposed a compressed quad seal 128 engaged with the peripheral surface of the rod reduced diameter portion 122 proximate its end. A washer 130 retains the quad seal in the annular recess 126. The whole assembly of the piston 24 is held at the end of the rod 26 over its reduced diameter portion 122 against the shoulder 123 by a resilient spring clip 132 placed in a groove 134 at the end of the rod reduced diameter portion 122.

Figure 7:
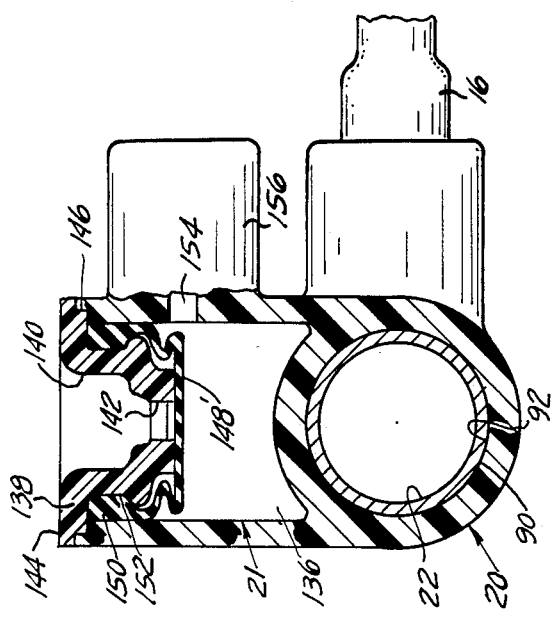
FIG. 7 is a view similar to FIG. 6, but showing a modification thereof.

As best shown at FIG. 5, the hydraulic fluid reservoir 21 comprises a four-walled enclosure 136 molded integrally on the top of the housing 20. The four-walled enclosure 136 is closed on its top by a lid 138 provided at its center with a boss 140 having at its bottom a port 142. The lid 138 has a peripheral flange 144 fitting over the edge 146 of the four-walled enclosure 136, and ultrasonically welded thereto, a rolling type elastomeric diaphragm 148, FIGS. 5 and 6, or a bellow type diaphragm 148', FIG. 7, being held under the lid 148 via its enlarged peripheral flange 150 trapped between the walls of the four-walled enclosure 136 and the peripheral rim 152 of the lid 138 integrally joining the main portion of the lid and its peripheral flange 144.

When the hydraulic apparatus consisting of the master cylinder 12, the slave cylinder 18 and the conduits 14 and 16, FIG. 1, fully assembled together, is filled with hydraulic fluid, as hereinafter explained, the reservoir 21 is also filled with hydraulic fluid introduced under the diaphragm 148 in the four-walled enclosure 136 through a port 154, FIG. 6, at the bottom of a laterally extending boss 156. After filling with hydraulic fluid, the port 154 is closed by means of a plug 158 threadably fastened in the bore of the boss 156.

The reservoir 21 is placed in fluid communication with the cylinder chamber 38, FIG. 5, on one side of the piston 24 by way of a valved passageway designated generally at 160 and with the cylinder chamber 40 on the other side of the piston 24 by way of an identical valved passageway designated generally at 160'. Each valved passageway 160 and 160' is arranged to allow hydraulic fluid to flow freely from the reservoir 21 to the respective cylinder chambers 38 and 40, but instantaneously prevents flow from the chamber 38 or 40 when hydraulic pressure is developed in the respective chamber as a result of displacing the piston 24 toward the end of the chamber.

Each valved passageway 160 and 160' comprises a vertically disposed cylindrical bore 162 in which is loosely disposed a ball 164. The bottom of the bore 162 is placed in communication with the cylinder chamber 38 or 40 by a port 166. The ball 164 rests by gravity on a spider 168, best shown at FIG. 10, which may consist, for example, of a tubular body member 170 integrally joined to the wall of the bore 162 by a plurality of spoke-like support bridges 172. The top of the bore 162 is provided with a cap 174, FIG. 5, which is sonically welded thereon. The cap 174 has a port 176 placing in fluid communication the interior of the four-walled enclosure 136 forming the reservoir 21 with the bore 162, and a bottom annular tapered surface 178 forming a seat for the ball 164 when pressure in the chamber 38 or 40 causes the ball 164 to be displaced upwardly such as to engage the annular tapered surface 178, thus preventing reverse flow from the cylinder chamber 38 or 40 into the four-walled enclosure 136. Displacement of the master cylinder piston 24 in one direction or the other causes sudden increase of hydraulic pressure in the chamber 38 or 40, and thus immediate engagement of the ball 164 with the bottom annular tapered surface 178, such that fluid is expelled from the master cylinder 12 only through the port 180, FIG. 11, placing the chamber 38 in communication with the conduit 14 or through the port 182 placing the chamber 40 in communication with the conduit 16 and transferring hydraulic fluid into the slave cylinder 18. Once the piston 24 occupies a finite position within the bore 22 of the master cylinder 12, which in turn causes the piston 24 of the slave cylinder 18 to occupy an analagous position, expansion of the hydraulic fluid, or contraction of the hydraulic fluid, in any portion of the system simply causes fluid to be slowly displaced into one of the chambers 38 or 40, or to be slowly withdrawn from one of the chambers. A slow flow of hydraulic fluid into one of the chambers 38 or 40 causes hydraulic fluid to slowly flow from the corresponding chamber into the reservoir 21 without lifting the corresponding ball 164 from its supporting spider 168. Slow decrease of pressure, or withdrawal of hydraulic fluid, from the chamber 38 or 40 causes hydraulic fluid to flow from the reservoir 21 into the corresponding chamber 38 or 40. The hydraulic apparatus functions as a double acting closed system, portion of the hydraulic fluid contained in the reservoir 21 being withdrawn from and returned to the reservoir only to maintain constant the volume of hydraulic fluid in the working portion of the apparatus, including compensating for loss of hydraulic fluid.

It will be appreciated that the cylinder end cap 27 is provided with appropriate cut-out portions as shown at 184 at FIGS. 5, 11 and 12, and with a groove 185, so as to allow free flow of hydraulic fluid from and into the chambers 40 of the master and slave cylinder into and from the conduit 16, and unimpeded flow from the chamber 40 of the master cylinder 12 from and into the reservoir 21. It will also be appreciated that, at rest, the hydraulic pressure in the whole apparatus is substantially atmospheric pressure, the flexible diaphragm 148 being subjected on its outside surface to atmospheric pressure through the port 142 in the reservoir lid 138. It will be further appreciated that any position occupied by the master cylinder output member 26 and the corresponding position occupied by the slave cylinder output member 42 are well defined with respect to the transmission mode selected in view of appropriate well-known detent plates of "rooster combs", not shown, adapted to retain the mode selector shift lever arm 30, FIGS. 1 and 2 and the transmission mode selection arm 44 and shaft 46 at the transmission 48, FIG. 1, in appropriate finite positions corresponding to the drive modes selected.

FIGS. 8–9 illustrate a modification of the valved passageways 160 and 160' which ensures faster response of the one-way valve arrangement and which prevents the ball 164 from sticking to the surface of the annular tapered valve seat 178. For that purpose, the port 176 leading from the bore 162, in which the ball is disposed, to the reservoir 21, is provided with a small cylinder 186 in which is disposed a piston 188, a groove 190, or a plurality of grooves, being provided in the wall of the port 176 such as to allow free passage of hydraulic fluid from the reservoir 21 to the chamber 38 or 40 via the bore 162 and past the cylinder 186. The piston 188 has a plunger 192, projecting through an appropriate aperture in an end wall 193 of the cylinder 186, engaging at its tip the peripheral surface of the ball 164. A chamber 194 is formed between the rear face of the piston 188 and the other end wall 196 of the cylinder 186. A conduit 198 places the chamber 194 of the cylinder 186 of the valved passageway 160' in fluid communication with the master cylinder chamber 38, for example by leading into the passageway bore 162 in which is disposed the ball 164 of the valved passageway 160 connecting to the cylinder chamber 38. Similarly, the chamber 194 of the cylinder 186 co-operating with the ball 164 in the valved passageway 160 is connected through a conduit 200 to the master cylinder chamber 40.

FIG. 8 illustrates the conditions under which the master cylinder piston 24 is retracted to the right, as seen in the drawing, as a result of a pull being exerted on the rod 26. The hydraulic fluid in the chamber 40 is thus under pressure causing the ball 164 to be firmly applied against the seat 178, thus preventing fluid from flowing from the chamber 40 into the reservoir 21 through the groove 190 of the port 176. Simultaneously, pressurized fluid flowing through the conduit 200 is applied in the chamber 194 of the cylinder 186 behind the piston 188, tending to urge the ball 164 of the valved passageway 160 away from its seat 178, thus allowing hydraulic fluid to pass from the reservoir 21 to the low pressure chamber 38. When, on the other hand, the chamber 38 is the high pressure chamber, the ball 164 in the valved passageway 160 is caused to be firmly applied against its seat 178 while, simultaneously, pressure is removed from the chamber 194, the conduit 200 being connected to the now low pressure chamber 40, thus allowing the plunger 192 to retract, while fluid from the high pressure chamber 38 flowing through the conduit 198 into the chamber 194 behind the piston 188 associated with the valved passageway 160' helps in unseating the corresponding ball 164 from its seat 178 by extending the corresponding plunger 192.

Figure 15:
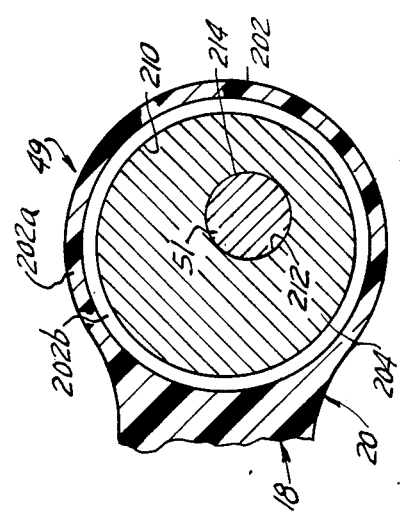
FIG. 15 is a view from line 15—15 of FIG. 12.
Figure 14:
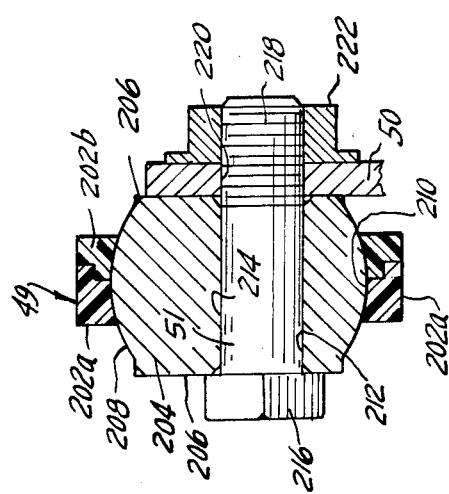
FIG. 14 is a section along line 14—14 of FIG. 4, or line 14—14 of FIG. 5.
Figure 13:
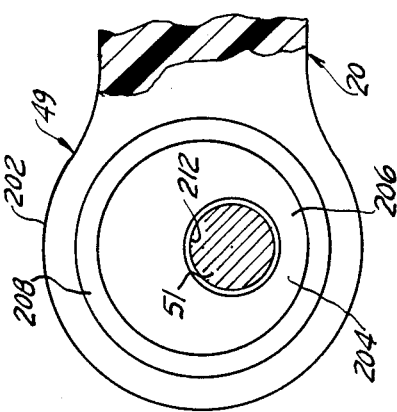
FIG. 13 is a partial view along line 13—13 of FIG. 4.

The master cylinder 12 and the slave cylinder 18 are each swively and self-adjustably attached by way of a bolt 51 to a stationary bracket 50 by way of identical integral lugs 49, each at an end of the respective housing 20. As best shown at FIGS. 13–15, the lug 49 takes the form of a partially spherical socket member 202 having a portion 202a, FIG. 14, formed integrally at the end of the housing 20 and a symmetrically disposed second portion 202b ultrasonically welded to the portion 202a after disposing, and thus trapping, a truncated spherical member 204 within the socket 202. The truncated spherical member 204 has two flat opposite parallel faces 206 and a partially spherical peripheral surface 208, such that the truncated spherical member 204 is held within the socket 202 with its peripheral spherical surface 208 in swivelling engagement with the spherical inner surface 210 of the socket 202. A transverse bore 212 is formed perpendicular to the end faces 206 of the truncated spherical member 204. The bore 212 is eccentric relative to the center of rotation of the truncated spherical member 204 within the socket 202. The bolt 51 has a smooth cylindrical body portion 214 that snuggly fits within the bore 212. By rotating the bolt 51 by means of an appropriate wrench or socket engaged with its hexagonal head 216 the truncated spherical member 204 is rotated such that the threaded end 218 of the bolt 51, FIG. 14, may be aligned with a mounting aperture 220 in the support bracket 50. A nut 222 is aligned with the mounting aperture 220 such as to be engageable by the threaded end 218 of the bolt 51 for solidly affixing, by tightening the bolt 51, the truncated spherical member 204 with one of its end faces 206 engaged with the surface of the mounting bracket 50. In such manner, any variation in distance between the mounting hole 220 of each bracket 50, to which is swively and pivotably attached one of the cylinder housings 20 and, respectively, the end of the master cylinder input rod 26 and of the slave cylinder output rod 42, may be compensated for, when installing the master cylinder 12 with its input rod 26 coupled to the arm 30 on the end of the shift lever 32, FIG. 1, or 52, FIG. 2, and the slave cylinder 18 with its output rod 42 coupled to the arm 44 of the mode selector shaft 46 of the transmission 48.

For example, assuming that the hydraulic apparatus has been prefilled with hydraulic fluid with the input rod 26 of the master cylinder 12 and the output rod 42 of the slave cylinder 18 extended to the position corresponding, for example, to neutral, by the corresponding restraining straps 60, those positions are also maintained by the restraining straps 60 not only during filling of the apparatus with hydraulic fluid, but also during shipment to a motor vehicle manufacturer and during assembly on a motor vehicle. During installation on the motor vehicle both the shift lever 32, FIG. 1, or 52, FIG. 2, is held in its appropriate position corresponding to neutral by its appropriate detent plate, not shown, and the transmission mode selector 44 is also held in the appropriate position corresponding to neutral by its appropriate detent plate, not shown, the end of the master cylinder input rod 26 is attached to the end of the arm 30, the end of the slave cylinder output member 42 is attached to the arm 44, and the cylinders are attached to their respective mounting brackets by rotating the truncated spherical member 204 within the respective socket 202 of the cylinder mounting lugs 49, until the mounting bolt 51 is aligned with the mounting hole 220 of the support bracket 50. The mounting bolts 51 are then tightened to securely attach each cylinder in its appropriate functional location.

It will be appreciated that the structure for attaching the cylinder lug 49 to the support bracket 50 allows pivoting of the cylinder housing 20 in a plurality of directions in view of the ball and socket arrangement provided by the truncated spherical member 204 capable of swivelling within the socket 202. It will be further appreciated that the clevis and pin coupling 28 of the end of the master cylinder input rod 26 with the shift lever arm 30, and the clevis and pin coupling 28 of the end of the slave cylinder output rod 42 with the mode selector lever 44, may also be effected by means of a similar truncated spherical member disposed in a socket attached to the end of the master cylinder input rod 26 and/or slave cylinder output rod 42.

Figure 6:
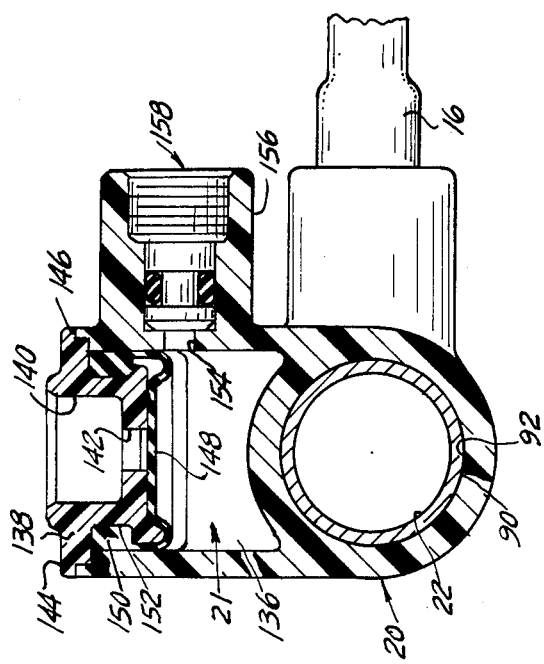
FIG. 6 is a transverse section of the master cylinder, with the piston omitted, along line 6—6 of FIG. 4.

The hydraulic apparatus of the invention, after full assembly and connecting the master cylinder 20 to the slave cylinder 18 by way of the respective conduits 14 and 16, is prefilled with hydraulic fluid by introducing hydraulic fluid under a slight pressure through the port 154, FIG. 6, into the reservoir 21 while purging air through a pair of bleed ports 224, for example leading into the chamber 38 and the chamber 40 of the slave cylinder 18, FIG. 12, each bleed port 224 being provided with a conventional bleed screw 223. After air has stopped bubbling through the bleed ports 224, and a solid stream of hydraulic fluid flows through each bleed port 224, thus indicating that the apparatus has been completely filled with hydraulic fluid, the bleed screws 223 are tightened, and the plug 158 is placed in the boss 156, FIG. 6, to obturate the filling port 154 in the master cylinder reservoir 21. Alternatively, the hydraulic apparatus may be filled according to the method disclosed in U.S. Pat. No. 4,503,678, assigned to the same assignee as the present application, by first evacuating atmospheric air from the apparatus by connecting a source of vacuum to the reservoir 21 through the port 154, while simultaneously applying vacuum to the top of the diaphragm 148 by connecting the source of vacuum to the port 142 in the reservoir lid 138 and to the bleed ports 223 of the slave cylinder 18. After the apparatus has been evacuated of atmospheric air, and tested for leakage and malfunction, the apparatus is filled with hydraulic fluid through the port 154 into the reservoir 21 and through the bleed ports 223 into the slave cylinder 18. If so desired, the conduits 114 and 116 may be provided at one end or at both ends with leakproof quick-connect connectors as disclosed in application Ser. Nos. 555,667, 609,020 and 680,329, all assigned to the same assignee as the present application, instead of being provided with permanently fitted connectors.

Having thus described the present invention by way of examples of structure well designed to accomplish the objects of the invention, modifications whereof will be apparent to those skilled in the art, what is claimed as new is as follows:

1. A hydraulic apparatus comprising a master cylinder including an elongated, axially extending tubular housing, a piston reciprocable axially in said housing and separating said housing into a first chamber on one side of said piston and a second chamber on the other side of said piston, an input rod connected at an end to said piston for reciprocating said piston, a remotely located slave cylinder including means partitioning said slave cylinder into a first chamber on one side thereof and a second chamber on the other side thereof, a first conduit placing said first chamber of said master cylinder in fluid communication with one of said chambers of said slave cylinder, a second conduit placing said second chamber of said master cylinder in fluid communication with the other of said chambers of said slave cylinder, and hydraulic fluid filling said master cylinder first and second chambers, said slave cylinder first and second chambers and said first and second conduits, whereby linear axial displacement of said master cylinder input member causes a corresponding linear axial displacement of said slave cylinder partition means, a reservoir of fluid attached to said master cylinder, a first passageway placing said reservoir in fluid communication by gravity with said master cylinder first chamber, a second passageway placing said reservoir in fluid communication by gravity with said master cylinder second chamber, and valve means in each of said passageways allowing free unrestricted flow of fluid from said reservoir to said chambers and preventing reverse flow of fluid from one of said chambers to said reservoir upon motion of said master cylinder piston causing a sudden increase of fluid pressure in said one of said chambers, said valve means allowing flow of fluid through each of said passageways from each of said chambers upon increase of volume of fluid in each of said chambers, said passageways being spaced apart axially by a distance greatly exceeding the extent of axial sealing engagement of said master cylinder piston with said master cylinder housing so that said master cylinder piston may reciprocate in said master cylinder housing over a wide range of axial movement without blocking either of said passageways.

2. The apparatus of claim 1 wherein said valve means comprises a valve body freely disposed in each of said passageways, a port above said valve body placing each of said passageways in communication with said reservoir, and a valve seat between said port and said valve body, whereby said valve body is normally held by gravity away from said valve seat and is engaged with said valve seat upon increase of pressure of the fluid in a corresponding one of said passageways.

3. The apparatus of claim 2 wherein said valve body is a ball.

4. The apparatus of claim 2 further comprising means urging said valve body away from said valve seat upon decrease of pressure of the fluid in said corresponding one of said passageways and increase of pressure of the fluid in the other of said passageways.

5. The apparatus of claim 1 further comprising swivelling means attaching an end of at least one of said cylinders to a support bracket, said swivelling means comprising a lug at said end, a partially spherical socket formed in said lug, a truncated spherical member disposed swivellable in said socket, said member having opposite planar faces projecting beyond said socket ends, an eccentric transverse bore from one of said faces to the other and a mounting bolt in said bore for attaching said members to said support bracket.

6. A hydraulic apparatus for remotely operating a motor vehicle automatic transmission mode select arm on the transmission casing, said apparatus comprising a master cylinder in the form of an axially elongated tubular first housing, a first piston axially reciprocable in said first housing and separating said first housing into a first chamber on one side of said first piston and a second chamber on the other side of said first piston, an input rod connected at an end to said first piston, a remotely located slave cylinder in the form of a second housing, a second piston reciprocable in said second housing and separating said second housing into a first chamber on one side of said second piston and a second chamber on the other side of said second piston, a first flexible conduit placing said first chamber of said master cylinder in fluid communication with one of said chambers of said slave cylinder, a second flexible conduit placing said second chamber of said master cylinder in fluid communication with the other of said chambers of said slave cylinder, an output rod member linearly displaceable by said second piston in said slave cylinder, and hydraulic fluid filling said master cylinder first and second chambers, said slave cylinder first and second chambers and said first and second flexible conduits, whereby linear displacement of said master cylinder input member as controlled by an operative mode transmission selection lever causes a corresponding linear displacement of said slave cylinder output member to operate a mode selection arm on the casing of the transmission, a reservoir of fluid attached to said master cylinder, a first passageway placing said reservoir in fluid communication by gravity with said master cylinder first chamber, a second passageway placing said reservoir in fluid communication by gravity with said master cylinder second chamber, and valve means in each of said passageways allowing free unrestricted flow of fluid from said reservoir to said chambers and preventing reverse flow of fluid from one of said chambers to said reservoir upon motion of said master cylinder piston causing a sudden increase of fluid pressure in said one of said chambers, said valve means allowing flow of fluid through each of said passageways from each of said chambers upon increase of volume of fluid in each of said chambers, said passageways being spaced apart axially by a distance greatly exceeding the extent of axial sealing engagement of said master cylinder piston with said master cylinder housing so that said master cylinder piston may reciprocate in said master cylinder housing over a wide range of axial movement corresponding to a plurality of positions of the transmission selection lever without blocking either of said passageways.

7. The apparatus of claim 6 wherein said valve means comprises a valve body freely disposed in each of said passageways, a port above said valve body placing said passageway in communication with said reservoir, and a valve seat between said port and said valve body, whereby said valve body is normally held by gravity away from said valve seat and engaged with said valve seat upon increase of pressure of the fluid in a corresponding one of said passageways.

8. The apparatus of claim 7 wherein said valve body is a ball.

9. The apparatus of claim 6 wherein said first and second housings are of equal bores.

10. The apparatus of claim 6 wherein said first and second pistons are identical.

11. The apparatus of claim 9 wherein said first and second pistons are identical.

12. The apparatus of claim 7 further comprising means urging said valve body away from said valve seat upon decrease of pressure of the fluid in said corresponding one of said passageways and increase of pressure of the fluid in the other of said passageways.

13. The apparatus of claim 6 further comprising swivelling means attaching an end of at least one of said cylinders to a support bracket, said swivelling means comprising a lug at said end, a partially spherical socket formed in said lug, a truncated spherical member disposed swivellable in said socket, said member having opposite planar faces projecting beyond said socket ends, an eccentric transverse bore from one of said faces to the other and a mounting bolt in said bore for attaching said member to said support bracket.

14. A hydraulic apparatus for remotely operating a motor vehicle automatic transmission mode selection arm on the transmission casing, said apparatus comprising a master cylinder in the form of an axially elongated tubular first housing, a first piston axially reciprocable in said first housing and separating said first housing into a first chamber on one side of said first piston and a second chamber on the other side of said first piston, an input rod connected at an end to said first piston and connected at its other end to an end of an arm attached to an operative mode shift lever whereby angular displacement of the shift lever causes linear displacement of said input rod, a remotely located slave cylinder in the form of a second housing, a second piston reciprocable in said second housing and separating said second housing into a first chamber on one side of said piston and a second chamber on the other side of said second piston, a first flexible conduit placing said first chamber of said master cylinder in fluid communication with one of said chambers of said slave cylinder, a second flexible conduit placing said second chamber of said master cylinder in fluid communication with the other of said chambers of said slave cylinder, an output rod member linearly displaceable by said second piston in said slave cylinder, means at the end of said output member connecting said output member to the transmission mode selection arm, and hydraulic fluid filling said master cylinder first and second chambers, said slave cylinder first and second chambers and said first and second flexible conduits, whereby linear displacement of said master cylinder input member as controlled by said operative mode shift lever causes a corresponding linear displacement of said slave cylinder output member to operate the transmission mode selection arm on the transmission casing, a reservoir of fluid attached to said master cylinder, a first passageway placing said reservoir in fluid communication by gravity with said master cylinder first chamber, a second passageway placing said reservoir in fluid communication by gravity with said master cylinder second chamber, and valve means in each of said passageways allowing free unrestricted flow of fluid from said reservoir to said chambers and preventing reverse flow of fluid from one of said chambers to said reservoir upon motion of said master cylinder piston causing a sudden increase of fluid pressure in said one of said chambers, said valve means allowing flow of fluid through each of said passageways from each of said chambers upon increase of volume of fluid in each of said chambers, said passageways being spaced apart axially by a distance greatly exceeding the extent of axial sealing engagement of said master cylinder piston with said master cylinder housing so that said master cylinder piston may reciprocate in said master cylinder housing over a wide range of axial movement corresponding to a plurality of positions of the mode selection arm on the transmission casing without blocking either of said passageways.

15. The apparatus of claim 14 wherein said valve means comprises a valve body freely disposed in each of said passageways, a port above said valve body placing said passageway in communication with said reservoir, and a valve seat between said port and said valve body, whereby said valve body is normally held by gravity away from said valve seat and is engaged with said valve seat upon increase of pressure of the fluid in a corresponding one of said passageways.

16. The apparatus of claim 15 wherein said valve body is a ball.

17. The apparatus of claim 14 wherein said first and second housings are of equal bores.

18. The apparatus of claim 14 wherein said first and second pistons are identical.

19. The apparatus of claim 17 wherein said first and second pistons are identical.

20. The apparatus of claim 15 further comprising means urging said valve body away from said valve seat upon decrease of pressure of the fluid in said corresponding one of said passageways and increase of pressure of the fluid in the other of said passageways.

21. The apparatus of claim 14 further comprising swivelling means attaching an end of at least one of said cylinders to a support bracket, said swivelling means comprising a lug at said end, a partially spherical socket formed in said lug, a truncated spherical member disposed swivellable in said socket, said member having opposite planar faces projecting beyond said socket ends, an eccentric transverse bore from one of said faces to the other and a mounting bolt in said bore for attaching said member to said support bracket.

* * * * *